US012710541B2

(12) United States Patent
Laifenfeld et al.

(10) Patent No.: US 12,710,541 B2
(45) Date of Patent: Aug. 18, 2026

(54) DIFFERENTIATING CLOSE-RANGE MEASUREMENTS OF TIME OF FLIGHT

(71) Applicant: Apple Inc., Cupertino, CA (US)

(72) Inventors: Moshe Laifenfeld, Haifa (IL); Dan Nussinson, Haifa (IL)

(73) Assignee: Apple Inc., Cupertino, CA (US)

(*) Notice: Subject to any disclaimer, the term of this patent is extended or adjusted under 35 U.S.C. 154(b) by 1103 days.

(21) Appl. No.: 17/838,218

(22) Filed: Jun. 12, 2022

(65) Prior Publication Data

US 2023/0058113 A1 Feb. 23, 2023

Related U.S. Application Data

(60) Provisional application No. 63/235,742, filed on Aug. 22, 2021.

(51) Int. Cl.
*G01S 17/894* (2020.01)
*G01B 11/22* (2006.01)
(Continued)

(52) U.S. Cl.
CPC ............ *G01S 17/894* (2020.01); *G01B 11/22* (2013.01); *G01S 7/4814* (2013.01); *G01S 7/4816* (2013.01);
(Continued)

(58) Field of Classification Search
CPC ...... G01S 7/497; G01S 7/4813; G01S 7/4865; G01S 7/4808; G01S 17/10; G01B 11/22
See application file for complete search history.

(56) References Cited

U.S. PATENT DOCUMENTS 4,623,237 A 11/1986 Kaneda et al.
4,757,200 A 7/1988 Shepherd
(Continued)

FOREIGN PATENT DOCUMENTS

CA 2605339 C 10/1994
CN 201054040 Y 4/2008
(Continued)

OTHER PUBLICATIONS

U.S. Appl. No. 16/532,513 Office Action dated Nov. 23, 2022.
(Continued)

*Primary Examiner* — Yuqing Xiao
*Assistant Examiner* — Rachel Nguyen
(74) *Attorney, Agent, or Firm* — Meitar Patents LTD.; Daniel Kligler

(57) ABSTRACT

An optical sensing device includes a light source, which emits one or more beams of light pulses toward a scene. An array of single-photon detectors output electrical pulses in response to photons that are incident thereon. Light collection optics form an image of the scene on the array. Processing circuitry counts the electrical pulses output by the single-photon detectors during multiple time intervals following each of the light pulses, detects, responsively to the counted pulses, an object located less than 10 cm away from the array, makes a comparison between respective counts of the electrical pulses output by the single-photon detectors group during a specified time interval immediately following each of a plurality of the light pulses, and ascertains, responsively to the comparison, whether the object reflecting the at least one of the beams is fixed to the device or separate from the device.

8 Claims, 2 Drawing Sheets

(51) Int. Cl.

| | |
|---|---|
| ***G01S 7/481*** | (2006.01) |
| ***G01S 7/4865*** | (2020.01) |
| ***G01S 7/497*** | (2006.01) |
| ***G08B 21/18*** | (2006.01) |

(52) U.S. Cl.

CPC ............ *G01S 7/4865* (2013.01); *G01S 7/497* (2013.01); *G08B 21/187* (2013.01)

(56) References Cited

U.S. PATENT DOCUMENTS 5,164,823 A 11/1992 Keeler
5,270,780 A 12/1993 Moran et al.
5,373,148 A 12/1994 Dvorkis et al.
5,699,149 A 12/1997 Kuroda et al.
6,301,003 B1 10/2001 Shirai et al.
6,384,903 B1 5/2002 Fuller
6,710,859 B2 3/2004 Shirai et al.
7,126,218 B1 10/2006 Darveaux et al.
7,193,690 B2 3/2007 Ossig et al.
7,303,005 B2 12/2007 Reis et al.
7,405,812 B1 7/2008 Bamji
7,508,496 B2 3/2009 Mettenleiter et al.
7,800,067 B1 9/2010 Rajavel et al.
7,800,739 B2 9/2010 Rohner et al.
7,812,301 B2 10/2010 Oike et al.
7,969,558 B2 6/2011 Hall
8,193,482 B2 6/2012 Itsler
8,259,293 B2 9/2012 Andreou
8,275,270 B2 9/2012 Shushakov et al.
8,279,418 B2 10/2012 Yee et al.
8,355,117 B2 1/2013 Niclass
8,405,020 B2 3/2013 Menge
8,594,425 B2 11/2013 Gurman et al.
8,675,181 B2 3/2014 Hall
8,736,818 B2 5/2014 Weimer et al.
8,766,164 B2 7/2014 Sanfilippo et al.
8,766,808 B2 7/2014 Hogasten
8,891,068 B2 11/2014 Eisele et al.
8,925,814 B1 1/2015 Schneider et al.
8,963,069 B2 2/2015 Drader et al.
9,002,511 B1 4/2015 Hickerson et al.
9,016,849 B2 4/2015 Fujisawa et al.
9,024,246 B2 5/2015 Jiang et al.
9,052,356 B2 6/2015 Chu et al.
9,076,707 B2 7/2015 Harmon
9,267,787 B2 2/2016 Shpunt et al.
9,335,220 B2 5/2016 Shpunt et al.
9,354,332 B2 5/2016 Zwaans et al.
9,386,299 B2 7/2016 Shpunt et al.
9,465,111 B2 10/2016 Wilks et al.
9,516,248 B2 12/2016 Cohen et al.
9,709,678 B2 7/2017 Matsuura
9,736,459 B2 8/2017 Mor et al.
9,739,881 B1 8/2017 Pavek et al.
9,761,049 B2 9/2017 Naegle et al.
9,786,701 B2 10/2017 Mellot et al.
9,810,777 B2 11/2017 Williams et al.
9,874,635 B1 1/2018 Eichenholz et al.
10,063,844 B2 8/2018 Adam et al.
10,067,224 B2 9/2018 Moore et al.
10,132,616 B2 11/2018 Wang
10,215,857 B2 2/2019 Oggier et al.
10,269,104 B2 4/2019 Hannuksela et al.
10,386,487 B1 8/2019 Wilton et al.
10,424,683 B1 9/2019 Do Valle et al.
10,613,203 B1 4/2020 Rekow et al.
10,782,393 B2 9/2020 Dussan et al.
10,795,001 B2 10/2020 Niclass et al.
11,415,679 B2 8/2022 Sharma et al.
11,693,102 B2 7/2023 Kudla et al.
2001/0020673 A1 9/2001 Zappa et al.
2002/0071126 A1 6/2002 Shirai et al.
2002/0131035 A1 9/2002 Watanabe et al.
2002/0154054 A1 10/2002 Small
2002/0186362 A1 12/2002 Shirai et al.
2004/0051859 A1 3/2004 Flockencier
2004/0135992 A1 7/2004 Munro
2004/0212863 A1 10/2004 Schanz et al.
2005/0018200 A1 1/2005 Guillermo et al.
2006/0044546 A1 3/2006 Lewin et al.
2006/0106317 A1 5/2006 McConnell et al.
2006/0176469 A1 8/2006 O'Connor et al.
2007/0145136 A1 6/2007 Wiklof et al.
2007/0164004 A1 7/2007 Matsuda et al.
2008/0231498 A1 9/2008 Menzer et al.
2009/0009747 A1 1/2009 Wolf et al.
2009/0262760 A1 10/2009 Krupkin et al.
2009/0273770 A1 11/2009 Bauhahn et al.
2009/0275841 A1 11/2009 Melendez et al.
2010/0019128 A1 1/2010 Itzler
2010/0045965 A1 2/2010 Meneely
2010/0096459 A1 4/2010 Gurevich
2010/0121577 A1 5/2010 Zhang et al.
2010/0250189 A1 9/2010 Brown
2010/0286516 A1 11/2010 Fan et al.
2010/0309288 A1 12/2010 Stettner et al.
2011/0006190 A1 1/2011 Alameh et al.
2011/0128524 A1 6/2011 Vert et al.
2011/0181864 A1 7/2011 Schmitt et al.
2011/0279366 A1 11/2011 Lohbihler
2012/0038904 A1 2/2012 Fossum et al.
2012/0075615 A1 3/2012 Niclass et al.
2012/0132636 A1 5/2012 Moore
2012/0153120 A1 6/2012 Baxter
2012/0154542 A1 6/2012 Katz et al.
2012/0176476 A1 7/2012 Schmidt et al.
2012/0249998 A1 10/2012 Eisele et al.
2012/0287242 A1 11/2012 Gilboa et al.
2012/0294422 A1 11/2012 Cheung et al.
2013/0015331 A1 1/2013 Birk et al.
2013/0079639 A1 3/2013 Hoctor et al.
2013/0092846 A1 4/2013 Henning et al.
2013/0107016 A1 5/2013 Federspiel
2013/0208258 A1 8/2013 Eisele et al.
2013/0236171 A1 9/2013 Saunders
2013/0258099 A1 10/2013 Ovsiannikov et al.
2013/0278917 A1 10/2013 Korekado et al.
2013/0300838 A1 11/2013 Borowski
2013/0342835 A1 12/2013 Blacksberg
2014/0027606 A1 1/2014 Raynor et al.
2014/0071433 A1 3/2014 Eisele et al.
2014/0077086 A1 3/2014 Batkilin et al.
2014/0078491 A1 3/2014 Eisele et al.
2014/0162714 A1 6/2014 Kim et al.
2014/0191115 A1 7/2014 Webster et al.
2014/0198198 A1 7/2014 Geissbuehler et al.
2014/0231630 A1 8/2014 Rae et al.
2014/0240317 A1 8/2014 Go et al.
2014/0240691 A1 8/2014 Mheen et al.
2014/0268127 A1 9/2014 Day
2014/0300907 A1 10/2014 Kimmel
2014/0321862 A1 10/2014 Frohlich et al.
2014/0353471 A1 12/2014 Raynor et al.
2015/0041625 A1 2/2015 Dutton et al.
2015/0062558 A1 3/2015 Koppal et al.
2015/0131080 A1 5/2015 Retterath et al.
2015/0163429 A1 6/2015 Dai et al.
2015/0192676 A1 7/2015 Kotelnikov et al.
2015/0200222 A1 7/2015 Webster
2015/0200314 A1 7/2015 Webster
2015/0204978 A1 7/2015 Hammes et al.
2015/0260830 A1 9/2015 Gosh et al.
2015/0285625 A1 10/2015 Deane et al.
2015/0362585 A1 12/2015 Gosh et al.
2015/0373322 A1 12/2015 Goma et al.
2016/0003944 A1 1/2016 Schmidtke et al.
2016/0041266 A1 2/2016 Smits
2016/0072258 A1 3/2016 Seurin et al.
2016/0080709 A1 3/2016 Viswanathan et al.
2016/0182101 A1 6/2016 Marcovic et al.
2016/0259038 A1 9/2016 Retterath et al.
2016/0259057 A1 9/2016 Ito
2016/0274222 A1 9/2016 Yeun

(56) References Cited

U.S. PATENT DOCUMENTS

2016/0334508 A1 11/2016 Hall et al.
2016/0344965 A1 11/2016 Grauer
2017/0006278 A1 1/2017 Vandame et al.
2017/0038459 A1 2/2017 Kubacki et al.
2017/0052065 A1 2/2017 Sharma et al.
2017/0067734 A1 3/2017 Heidemann et al.
2017/0068393 A1 3/2017 Viswanathan et al.
2017/0131388 A1 5/2017 Campbell et al.
2017/0131718 A1 5/2017 Matsumura et al.
2017/0139041 A1 5/2017 Drader et al.
2017/0176577 A1 6/2017 Halliday
2017/0176579 A1 6/2017 Niclass et al.
2017/0179173 A1 6/2017 Mandai et al.
2017/0184450 A1 6/2017 Doylend et al.
2017/0184704 A1 6/2017 Yang et al.
2017/0184709 A1 6/2017 Kenzler et al.
2017/0188016 A1 6/2017 Hudman
2017/0219695 A1 8/2017 Hall et al.
2017/0242102 A1 8/2017 Dussan et al.
2017/0242108 A1 8/2017 Dussan et al.
2017/0257617 A1 9/2017 Retterath
2017/0269209 A1 9/2017 Hall et al.
2017/0303789 A1 10/2017 Tichauer et al.
2017/0329010 A1 11/2017 Warke et al.
2017/0343675 A1 11/2017 Oggier et al.
2017/0356796 A1 12/2017 Nishio
2017/0356981 A1 12/2017 Yang et al.
2018/0045816 A1 2/2018 Jarosinski et al.
2018/0059220 A1 3/2018 Irish et al.
2018/0062345 A1 3/2018 Bills et al.
2018/0081030 A1 3/2018 McMahon et al.
2018/0081032 A1 3/2018 Torruellas et al.
2018/0081041 A1 3/2018 Niclass et al.
2018/0081061 A1 3/2018 Mandai et al.
2018/0115762 A1 4/2018 Bulteel et al.
2018/0131449 A1 5/2018 Kare et al.
2018/0167602 A1 6/2018 Pacala et al.
2018/0203247 A1 7/2018 Chen et al.
2018/0205943 A1 7/2018 Trail
2018/0209846 A1 7/2018 Mandai et al.
2018/0259645 A1 9/2018 Shu et al.
2018/0299554 A1 10/2018 Van Dyck et al.
2018/0341009 A1 11/2018 Niclass et al.
2019/0004156 A1 1/2019 Niclass et al.
2019/0011556 A1 1/2019 Pacala et al.
2019/0011567 A1 1/2019 Pacala et al.
2019/0018117 A1 1/2019 Perenzoni et al.
2019/0018118 A1 1/2019 Perenzoni et al.
2019/0018119 A1 1/2019 Laifenfeld et al.
2019/0018143 A1 1/2019 Thayer et al.
2019/0037120 A1 1/2019 Ohki
2019/0056497 A1 2/2019 Pacala et al.
2019/0094364 A1 3/2019 Fine et al.
2019/0170855 A1 6/2019 Keller et al.
2019/0178995 A1 6/2019 Tsai et al.
2019/0257950 A1 8/2019 Patanwala et al.
2019/0277952 A1 9/2019 Beuschel et al.
2019/0361404 A1 11/2019 Mautner et al.
2020/0081122 A1* 3/2020 Uedaira .................. G01S 17/06
2020/0142033 A1 5/2020 Shand
2020/0233068 A1 7/2020 Henderson et al.
2020/0249324 A1 8/2020 Steinberg et al.
2020/0256669 A1 8/2020 Roth et al.
2020/0256993 A1 8/2020 Oggier
2020/0309955 A1 10/2020 Laflaquiere et al.
2020/0314294 A1 10/2020 Schoenlieb et al.
2020/0386890 A1 12/2020 Oggier et al.
2021/0007248 A1 1/2021 Huang et al.
2021/0164776 A1 6/2021 Roth et al.
2021/0165083 A1 6/2021 Fine et al.
2022/0075042 A1* 3/2022 Van Der Lee ........ G01S 7/4808
2022/0146647 A1 5/2022 Sakazume
2022/0244391 A1 8/2022 Mandai et al.
2022/0283307 A1 9/2022 Laifenfeld et al.
2023/0108583 A1* 4/2023 Azuma ................ G01S 7/4863
356/5.01

FOREIGN PATENT DOCUMENTS

CN 101401107 A 4/2009
CN 103763485 A 4/2014
CN 103983979 A 8/2014
CN 104730535 A 6/2015
CN 104914446 A 9/2015
CN 105992960 A 10/2016
CN 106405572 A 2/2017
CN 110609293 A 12/2019
DE 202013101039 U1 3/2014
DE 102015013710 A1 4/2017
EP 2157445 A2 2/2010
EP 2322953 A1 5/2011
EP 2469297 A1 6/2012
EP 2477043 A1 7/2012
EP 2827175 A2 1/2015
EP 3285087 A1 2/2018
EP 3370080 A1 9/2018
EP 3521856 A1 8/2019
GB 2492848 A 1/2013
JP H02287113 A 11/1990
JP H0567195 A 3/1993
JP 09197045 A 7/1997
JP H10170637 A 6/1998
JP H11063920 A 3/1999
JP 2011089874 A 5/2011
JP 2011237215 A 11/2011
JP 2013113669 A 6/2013
JP 2014059301 A 4/2014
JP 2016070796 A * 5/2016 ............. G01S 7/497
JP 2020197457 A 12/2020
JP 7383558 B2 11/2023
KR 101318951 B1 10/2013
TW 202343020 A 11/2023
WO 9008946 A1 8/1990
WO 2007144565 A2 12/2007
WO 2010149593 A1 12/2010
WO 2011041040 A1 4/2011
WO 2012154356 A1 11/2012
WO 2013028691 A1 2/2013
WO 2014066178 A1 5/2014
WO 2015199615 A1 12/2015
WO 2016034408 A1 3/2016
WO 2017106875 A1 6/2017
WO 2018122560 A1 7/2018
WO 2020101576 A1 5/2020
WO 2020109378 A1 6/2020
WO WO-2020147116 A1 * 7/2020 ............. G01S 7/497
WO 2020201452 A1 10/2020
WO 2022035549 A1 2/2022
WO 2022244322 A1 11/2022

OTHER PUBLICATIONS

KR Application # 1020220101419 Office Action dated Sep. 28, 2022.
U.S. Appl. No. 17/026,365 Office Action dated Nov. 7, 2022.
CN Application # 201810571820.4 Office Action dated Sep. 9, 2022.
EP Application # 22167103.5 Search Report dated Jul. 11, 2022.
CN Application # 201780058088.4 Office Action dated Aug. 23, 2022.
Barak et al., U.S. Appl. No. 16/679,360, filed Nov. 11, 2019.
U.S. Appl. No. 16/532,513 Office Action dated Aug. 4, 2022.
CN Application # 201980090098.5 Office Action dated Dec. 4, 2023.
IN Application # 202117028974 Summons to Hearing dated Dec. 8, 2023.
CN Application # 202010521767.4 Office Action dated Dec. 8, 2023.

(56) References Cited

OTHER PUBLICATIONS

CN Application # 201980090030.7 Office Action dated Jan. 5, 2024.
U.S. Appl. No. 17/189,300 Office Action dated Jun. 4, 2024.
Zhu Jian, "Research of Simulation of Super-Resolution Reconstruction of Infrared Image", abstract page, Master's Thesis, p. 1, Nov. 15, 2005.
Laifenfeld, U.S. Appl. No. 17/512,708, filed Oct. 28, 2021.
Zhu et al., "Measurement Method for Real-Time Transmission of Optical Signal Based on Single Photon Detection," Chinese Journal of Lasers, vol. 43, No. 2, pp. 1-6, year 2016.
Yang, "The Study of Phase-Demodulation Range-Finding Techniques Based o SPAD," Chinese Master's Thesis Full-text Database, Engineering Science and Technology, Xiangtan University, pp. 1-63, May 2016.
Zhang, "Structured Light Based Fast and High Accuracy Depth Sensing," China Doctoral Dissertations Full-text Database, Information Science and Technology, University of Science and Technology of China, pp. 1-110, Apr. 2015.
Ionescu et al., "A 3D NIR Camera for Gesture Control of Video Game Consoles," Conference Paper, 2014 IEEE International Conference on Computational Intelligence and Virtual Environments for Measurement Systems and Applications (CIVEMSA), pp. 1-5, year 2014.
U.S. Appl. No. 16/769,346 Office Action dated Aug. 3, 2023.
CN Application # 202010063812.6 Office Action dated Aug. 1, 2023.
Charbon et al., "SPAD-Based Sensors", TOF Range-Imaging Cameras, Springer-Verlag, pp. 11-38, year 2013.
Niclass et al., "A 0.18 um CMOS SoC for a 100m range, 10 fps 200×96 pixel Time of Flight depth sensor", IEEE International Solid-State Circuits Conference—(ISSCC), Session 27, Image Sensors, 27.6, pp. 488-490, Feb. 20, 2013.
Walker et al., "A 128×96 pixel event-driven phase-domain ΔΣ-based fully digital 3D camera in 0.13 μm CMOS imaging technology", IEEE International Solid-State Circuits Conference—(ISSCC), Session 23, Image Sensors, 23.6, pp. 410-412, Feb. 23, 2011.
Niclass et al., "Design and characterization of a 256x64-pixel single-photon imager in CMOS for a MEMS-based laser scanning time-of-flight sensor", Optics Express, vol. 20, issue 11, pp. 11863-11881, May 21, 2012.
Kota et al., "System Design and Performance Characterization of a MEMS-Based Laser Scanning Time-of-Flight Sensor Based on a 256×64-pixel Single-Photon Imager", IEEE Photonics Journal, vol. 5, issue 2, pp. 1-15, Apr. 2013.
Webster et al., "A silicon photomultiplier with >30% detection efficiency from 450-750nm and 11.6μm pitch NMOS-only pixel with 21.6% fill factor in 130nm CMOS", Proceedings of the European Solid-State Device Research Conference (ESSDERC) , pp. 238-241, Sep. 7-21, 2012.
Bradski et al., "Learning OpenCV", first edition, pp. 1-50, O'Reilly Media, Inc, California, USA, year 2008.
Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.
Morbi et al., "Short range spectral lidar using mid-infrared semiconductor laser with code-division multiplexing technique", Technical Digest, CLEO 2001, pp. 491-492, May 2001.
Al et al., "High-resolution random-modulation cw lidar", Applied Optics, vol. 50, issue 22, pp. 4478-4488, Jul. 28, 2011.
Chung et al., "Optical orthogonal codes: design, analysis and applications", IEEE Transactions on Information Theory, vol. 35, issue 3, pp. 595-604, May 1989.
Lin et al., "Chaotic lidar", IEEE Journal of Selected Topics in Quantum Electronics, vol. 10, issue 5, pp. 991-997, Sep.-Oct. 2004.
U.S. Appl. No. 17/079,548 Office Action dated Mar. 3, 2023.
CN Application # 201780097602.5 Office Action dated Mar. 15, 2023.
CN Application # 202010063812.6 Office Action dated Mar. 18, 2023.
KR Application # 1020217025136 Office Action dated Apr. 4, 2023.
U.S. Appl. No. 17/026,365 Office Action dated Jan. 26, 2023.

* cited by examiner

DIFFERENTIATING CLOSE-RANGE MEASUREMENTS OF TIME OF FLIGHT

CROSS-REFERENCE TO RELATED APPLICATION

This application claims the benefit of U.S. Provisional Patent Application 63/235,742, filed Aug. 22, 2021, which is incorporated herein by reference.

FIELD OF THE INVENTION

The present invention relates generally to depth mapping, and particularly to devices and methods for depth mapping based on sensing of time of flight (ToF).

BACKGROUND

Time-of-flight (ToF) imaging techniques are used in many depth mapping systems (also referred to as 3D mapping or 3D imaging systems). In direct ToF techniques, a light source, such as a pulsed laser, directs pulses of optical radiation toward the scene that is to be mapped, and a high-speed detector senses the time of arrival of the radiation reflected from the scene. (The terms "light" and "illumination," as used in the context of the present description and in the claims, refer to optical radiation in any or all of the visible, infrared, and ultraviolet ranges.) The depth value at each pixel in the depth map is derived from the difference between the emission time of the outgoing pulse and the arrival time of the reflected radiation from the corresponding point in the scene, which is referred to as the "time of flight" of the optical pulses. The radiation pulses that are reflected back and received by the detector are also referred to as "echoes."

Some ToF-based depth mapping systems use detectors based on single-photon avalanche diode (SPAD) arrays. SPADs, also known as Geiger-mode avalanche photodiodes (GAPDs), are detectors capable of capturing individual photons with very high time-of-arrival resolution, of the order of a few tens of picoseconds. They may be fabricated in dedicated semiconductor processes or in standard CMOS technologies. Arrays of SPAD sensors, fabricated on a single chip, have been used experimentally in 3D imaging cameras.

For efficient detection, SPAD arrays may be integrated with dedicated processing circuits. For example, U.S. Patent Application Publication 2017/0052065, whose disclosure is incorporated herein by reference, describes a sensing device that includes a first array of sensing elements (such as SPADs), which output a signal indicative of a time of incidence of a single photon on the sensing element. A second array of processing circuits are coupled respectively to the sensing elements and comprise a gating generator, which variably sets a start time of the gating interval for each sensing element within each acquisition period, and a memory, which records the time of incidence of the single photon on each sensing element in each acquisition period. A controller processes a histogram of respective counts over different time bins for each sensing element so as to derive and output a respective time-of-arrival value for the sensing element.

U.S. Patent Application Publication 2021/0165083, whose disclosure is incorporated herein by reference, describes a configurable array of single-photon detectors. An array of single-photon detectors, such as SPADs, are disposed on a semiconductor substrate and output electrical pulses in response to incident photons. An array of counters, also disposed on the semiconductor substrate, count the electrical pulses output by the single-photon detectors. Routing and aggregation logic on the substrate is able to vary the configuration of the counters, relative to the detectors, in response to external control signals, and specifically to connect different groups of the single-photon detectors to different counters.

SUMMARY

Embodiments of the present invention that are described hereinbelow provide improved devices and methods for ToF-based depth mapping.

There is therefore provided, in accordance with an embodiment of the invention, an optical sensing device, including a light source, which is configured to emit one or more beams of light pulses toward a scene, and an array of single-photon detectors, which are configured to output electrical pulses in response to photons that are incident thereon. Light collection optics are configured to form an image of the scene on the array. Processing circuitry, is configured to count the electrical pulses output by the single-photon detectors during multiple time intervals following each of the light pulses, to detect, responsively to the counted pulses, an object located less than 10 cm away from the array that reflects at least one of the beams onto a group of the single-photon detectors, to make a comparison between respective counts of the electrical pulses output by the single-photon detectors in the group during a specified time interval immediately following each of a plurality of the light pulses, and to ascertain, responsively to the comparison, whether the object reflecting the at least one of the beams is fixed to the device or separate from the device.

In some embodiments, the processing circuitry is configured to estimate, responsively to counts of the electrical pulses received from the single-photon detectors during the multiple time intervals, times of flight of the photons to and from points in the scene and to generate a three-dimensional map of the scene based on the times of flight. In a disclosed embodiment, the processing circuitry is configured to detect the object by identifying an area in the scene from which the estimated times of flight of the photons are less than a predefined minimum value.

Additionally or alternatively, the light source includes at least one laser, and the processing circuitry is configured to detect, based on the comparison, changes in a speckle pattern that is scattered from the object.

In some embodiments, the processing circuitry is configured to compute differences between respective first and second numbers of the electrical pulses output by each of the single-photon detectors in the group that were counted in the specified time interval following first and second sequences of the light pulses, and to make the comparison by comparing the differences to a predefined threshold. In a disclosed embodiment, the processing circuitry is configured to identify the object as being separate from the device when at least one of the differences is greater than the predefined threshold, and otherwise to identify the object as being fixed to the device.

Additionally or alternatively, the processing circuitry is configured to issue an alarm indicating a malfunction of the device upon ascertaining that the object is fixed to the device.

There is also provided, in accordance with an embodiment of the invention, a method for optical sensing, which includes emitting one or more beams of light pulses from a depth-sensing device toward a scene. An image of the scene is formed on an array of single-photon detectors in the depth-sensing device. Electrical pulses output by the single-photon detectors in response to photons that are incident thereon are counted during multiple time intervals following each of the light pulses. Responsively to the counted pulses, an object located less than 10 cm away from the array that reflects at least one of the beams onto a group of the single-photon detectors is detected. A comparison is made between respective counts of the electrical pulses output by the single-photon detectors in the group during a specified time interval immediately following each of a plurality of the light pulses. It is ascertained, responsively to the comparison, whether the object reflecting the at least one of the beams is fixed to the device or separate from the device.

The present invention will be more fully understood from the following detailed description of the embodiments thereof, taken together with the drawings in which:

DETAILED DESCRIPTION OF EMBODIMENTS

Figure 1:
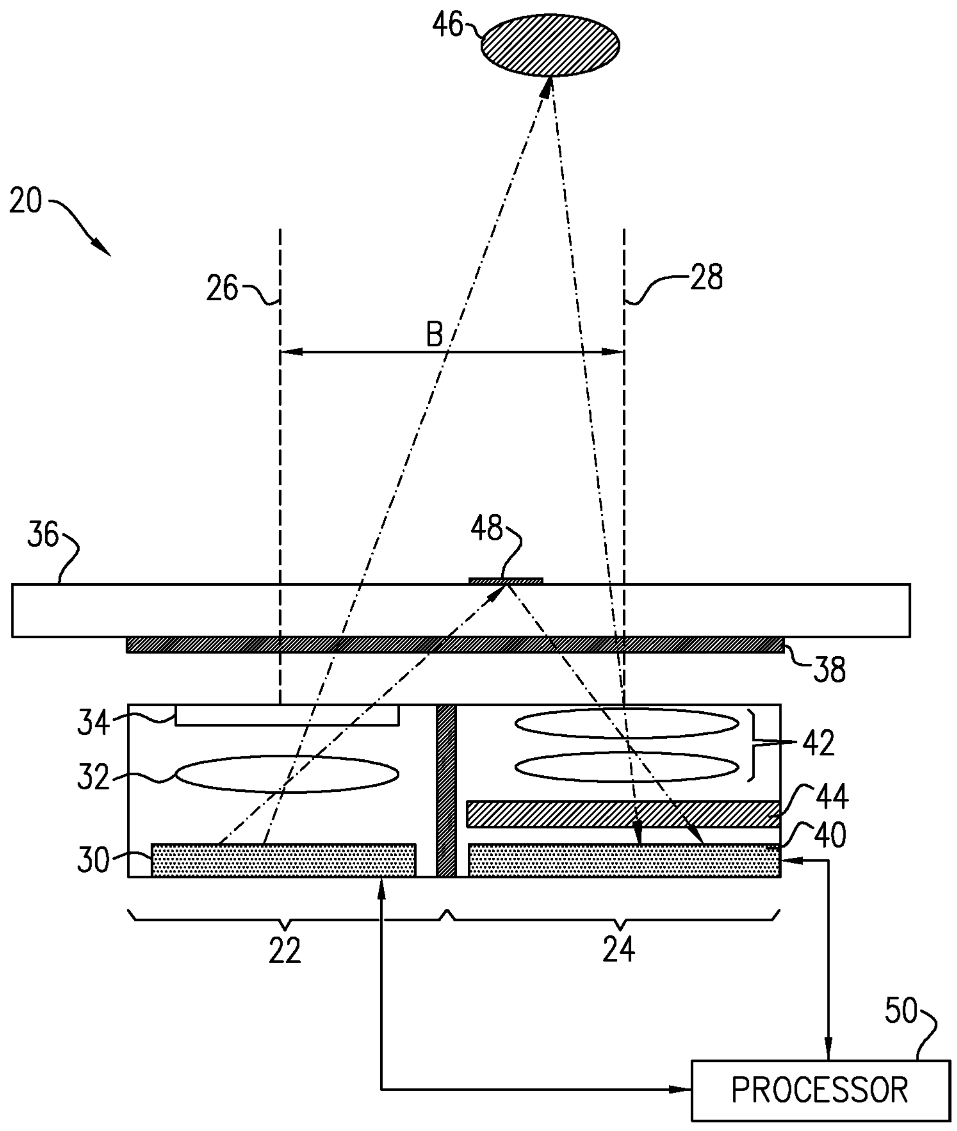
FIG. 1 is a schematic side view of a depth mapping device, in accordance with an embodiment of the invention.

ToF-based optical sensing devices generally work best in mapping target scenes at relatively long ranges, in which the times of flight of photons to and from the scene are in the tens of nanoseconds or more. At shorter distances, the ToF measurements can be distorted due to the high intensity of the reflected light pulses, as well as by stray reflections of the transmitted beam. Such stray reflections may originate from objects that are fixed to the device, for example from surfaces within the housing of the device or from smudges and scratches on an optical surface of the device, such as on the external cover window of the device.

Stray reflections onto a group of single-photon detectors in an area of a detector array can mask the signals from actual objects in the scene that are imaged onto that area. It is therefore important to identify stray reflections and take remedial action when possible (such as cleaning a smudge or repairing the sensing device). It can be difficult, however, to distinguish the effects of such stray reflections from photons that are reflected from nearby objects in the scene, for example objects less than 10 cm from the device: Both stray reflections and reflections from nearby objects give rise to strong output signals from the single-photon detectors in a time interval that immediately follows each of the light pulses emitted by the light source in the sensing device, and the detectors are generally unable to resolve the small temporal difference between the two types of reflections.

Embodiments of the present invention that are described herein address this problem using the variations that occur (or do not occur) in the signals output by the single-photon detectors in the area of the array in question.? These embodiments are based on the observation that reflections from objects that are fixed to the sensing device, whether internally or externally, will be static over time, whereas reflections from objects that are separate from the device will vary due to movements of the objects and/or of the device itself. In particular, when the light pulses directed toward the scene are generated by a laser or lasers, the light scattered from the object will form a speckle pattern. Due to the random nature of the speckle pattern, even very small movements of the object or of the device will cause significant changes in the pattern. By comparing the counts of electrical pulses output by the single-photon detectors in response to successive light pulses, it is possible to detect these changes and thus to ascertain whether the object in question is fixed to the device or separate from the device.

Thus, the embodiments described below provide a sensing device comprising a light source, which emits one or more beams of light pulses toward a scene, and an array of single-photon detectors, which output electrical pulses in response to incident photons. Light collection optics form an image of the scene on the array. For purposes of depth mapping, processing circuitry counts the electrical pulses output by the single-photon detectors during multiple time intervals following each of the light pulses.

Based on the counted pulses, the processing circuitry detects an object located close to the array of single-photon detectors, for example less than 10 cm away, which reflects at least one of the beams onto a group of the single-photon detectors. (A large count of pulses in a time interval immediately following each light pulse is indicative of such a nearby object.) The processing circuitry makes a comparison between respective counts of the electrical pulses that are output by the single-photon detectors in this group during a specified time interval, i.e., within a certain time window immediately following each of a sequence of the light pulses. Based on this comparison, the processing circuitry ascertains whether the object is fixed to the device or separate from the device. FIG. 1 is a schematic side view of a depth mapping device 20, in accordance with an embodiment of the invention. Device 20 comprises a light source, identified as a transmitting (Tx) laser projector 22, and a receiving (Rx) camera 24, with respective optical axes 26 and 28 that are offset transversely by a baseline offset B, as shown in the figure.

Tx laser projector 22 comprises an array 30 of emitters, such as a monolithic array of vertical-cavity surface-emitting lasers (VCSELs), which emit respective beams of light pulses. Collimating optics 32 project these beams at different, respective angles toward corresponding areas of a target scene. To increase the number of projected beams in the pictured embodiment, a diffractive optical element (DOE) 34 splits the projected beam pattern into multiple adjacent or overlapping copies, thus creating a denser pattern of spots extending over the target scene. A cover window 36 of the device includes a filter 38, for example an infrared (IR) filter, in order to prevent light outside the optical working range from exiting and entering the device.

Rx camera 24 comprises an array 40 of single-photon detectors, which are configured to output electrical pulses in response to photons that are incident thereon. In the present embodiment, the sensing elements comprise SPADS, for example, so that the output signals are indicative of respective times of arrival of photons on the sensing elements. Alternatively, the techniques described herein may be applied, mutatis mutandis, to detectors of other types. Light collection optics 42 image the target scene onto the SPAD array, while a bandpass filter 44 blocks incoming light that is outside the emission band of the Tx laser projector.

Each of the beams emitted by Tx laser projector 22 illuminates a corresponding area of the target scene, and light collection optics 42 image this area onto a certain, respective region of SPAD array 40. An array of counters (not shown) count, during respective time intervals, the electrical pulses that are output by respective sets of one or more of the SPADs. Counter circuits that may be used for this purpose are described, for example, in the above-mentioned U.S. Patent Application Publication 2021/0165083. A processor 50 sets the respective time intervals of the counters and estimates times of flight of the photons to and from points in the scene based on the counts of the electrical pulses received from the single-photon detectors during these intervals. Processor 50 generates a three-dimensional map of the scene based on the estimated times of flight.

The counter circuits and processor 50, along with ancillary circuits for pulse aggregation, timing control, and data readout, are referred to collectively in the present description and in the claims as "processing circuitry." The counters and ancillary circuits are typically implemented in digital logic, while processor 50 comprises a programmable processing unit, operating under the control of suitable software. Alternative implementations will also be apparent to those skilled in the art after reading the present description and are considered to be within the scope of the present invention.

In the example scenario that is shown in FIG. 1, a number of the beams that are emitted by projector 22 are reflected back and focused onto array 40 from a nearby object 46, while other beams are reflected back from a smudge 48 on cover window 36. Object 46 is assumed to be close to device 20, for example less than 10 cm from array 40. Consequently, the photons reflected from object due to any given light pulse from projector 22 will be incident on array 40 less than 1 ns after the light pulse. The electrical pulses output by the SPADs in response to these photons will occur and be counted in a time interval immediately following each of the light pulses. Photons reflected from smudge 48 will also give rise to pulses within this same time interval. Given the temporal width of the light pulses (typically on the order of 1 ns) and the temporal resolution of the counters, processor 50 may be unable to ascertain on the basis of the measured times of flight whether these reflections are from objects that are fixed to device 20, such as smudge 48, or separate from the device, such as object 46.

Methods for resolving this uncertainty, and specifically for identifying whether the source of short-range reflections are due to object 46 or smudge 48 (or some other surface fixed to device 20), are described below. Although these methods are described here, for the sake of convenience and clarity, with specific reference to the structure and components of device 20, the principles of this method may similarly be implemented, mutatis mutandis, in other sorts of ToF-based depth sensing devices. For example, although device 20 in FIG. 1 has a bistatic configuration, the present method may be applied in monostatic devices, as well. All such alternative implementations are considered to be within the scope of the present invention.

Figure 2:
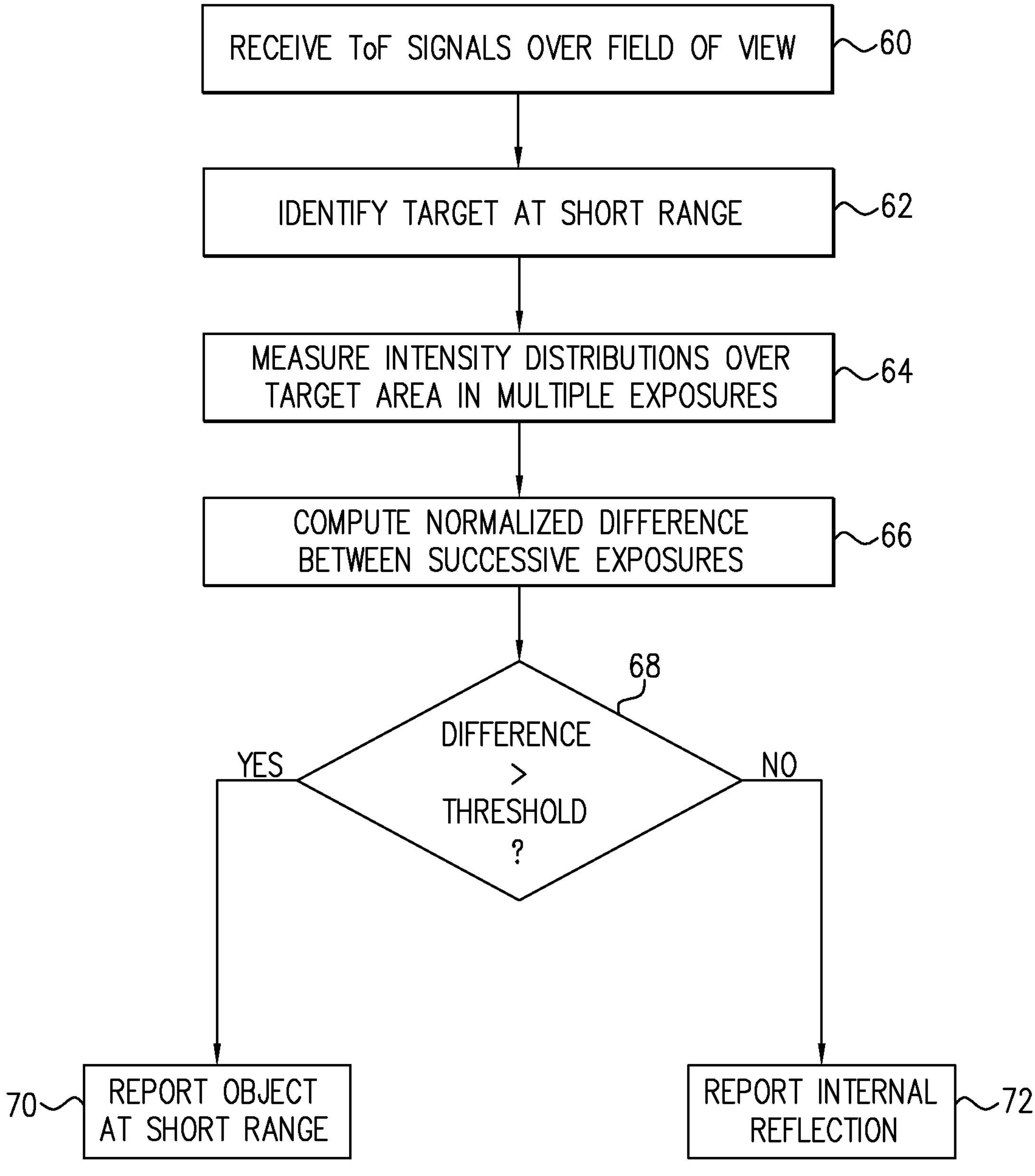
FIG. 2 is a flow chart that schematically illustrates a method for processing signals generated by a depth mapping device, in accordance with an embodiment of the invention.

FIG. 2 is a flow chart that schematically illustrates a method for processing signals generated by depth mapping device 20, in accordance with an embodiment the of invention. The method is directed particularly to ascertaining whether nearby objects detected by device 20 are fixed to or separate from the device.

Laser projector 22 emits beams of light toward a scene, and optics 42 image this area onto SPAD array 40. Processor 50 receives counts of the electrical pulses output by the SPADs in a sequence of time intervals, and based on these counts estimates the time of flight of the photons to and from multiple points in the field of view of device 20, at a ToF measurement step 60. In the course of this measurement, processor 50 identifies one or more areas of array 40 in which the counts are concentrated in a time interval immediately following each light pulse, meaning that the estimated times of flight of the photons in this area are less than a predefined minimum value, for example 2 ns. Processor 50 identifies this area of array 40 as corresponding to a target at short range, i.e., the photons received by the SPADs in this area are reflected from an object close to array 40, at a target identification step 62.

In response to this identification, processor 50 sets the counters in this area of array 40 to count the electrical pulses that are output from the SPADs in the area during a specified time interval immediately following each of a sequence of light pulses emitted by laser projector 22. For example, the processor may assign a respective counter to count the electrical pulses that are output individually by each of the SPADs in this group during the specified interval. Processor 50 receives the count of pulses output by each of the SPADs in the group during the specified time interval over a sequence of light pulses, at a multiple exposure measurement step 64. This pulse count is proportional to the intensity of reflections received by each SPAD, and thus to the intensity of the reflections from a respective point on the target that is reflected onto each SPAD.

For example, laser projector 22 may output several trains of light pulses, with a certain null time between successive pulse trains, and processor 50 may then measure the respective pulse count received from each SPAD in the area of interest over each of the pulse trains. In this case, each "exposure" corresponds to one of the pulse trains in the succession. The number of pulses in each pulse trains should be large enough to easily differentiate between speckle noise and shot noise. As shot noise typically increases as the square root of the number of pulses, and speckle noise is linearly proportional to the number of pulses, this condition is easily met by pulse trains of a few thousand pulses.

Processor 50 makes a comparison between the respective counts of the electrical pulses output by the SPADs in the group during the specified time interval immediately following each light pulse. Specifically, in the present embodiment, processor 50 computes differences in the counts of the electrical pulses output by each of the SPADs between different pairs of exposures, at a difference computation step 66. In other words, processor 50 subtracts the counts that were accumulated from each SPAD over different trains of the light pulses. The processor typically normalizes the differences, for example according to the average number of counts received over the pair of exposures (or over the succession of exposures). Alternatively, processor 50 may use other measures for purposes of comparing the pulse counts, for example by constructing histograms of the numbers of counts per temporal bin over the sequence of exposures. Such a histogram may enable more accurate estimation of the signal variations between exposures and create a clearer distinction between speckle noise and shot noise.

Processor 50 compares the count differences found in step 66 to a predefined threshold, at a difference comparison step 68. For example, the processor may choose the largest normalized difference that it found over all of the pairs of exposures among all the SPADs in the group and compare this value to the threshold. Alternatively, the processor may apply a threshold to a certain subset or average of the normalized differences. The threshold may be set, for example, to a small multiple of the standard deviation of the shot noise. When the difference found at step 66 for a given area of array 40 is greater than the threshold, processor 50 identifies this area as receiving reflections from an object that is separate from device 20 (for example, object 46 in FIG. 1), at a separate object identification step. Otherwise, processor 50 identifies the object giving rise to the reflections as being fixed to the device (for example, smudge 48), at an internal reflection identification step 72. The threshold to be applied at step 68, as well the specific mode and parameters of the comparison of the differences in pixel counts that is used at steps 66 and 68, may be chosen and optimized heuristically based on the specific design and performance of device 20.

In some embodiments, the identifications made at steps 70 and 72 are reported in the context of the depth maps output by processor 50. For example, nearby external objects identified at step 70 may be represented in the depth map at their estimated distances from device 20. On the other hand, the areas covered by objects giving rise to internal reflections may be represented in the depth as having unknown depth coordinates. If these latter areas are large and persistent, processor 50 may issue an alarm indicating a malfunction of device 20, for example by outputting a message to a user of the device. The alarm may prompt the user, for example, to inspect and clean cover window 36 if necessary.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical sensing device, comprising:

a light source, which is configured to emit one or more beams of light pulses toward a scene, wherein the light source comprises at least one laser configured to generate coherent light, which forms a speckle pattern when scattered from objects;

an array of single-photon detectors, which are configured to output electrical pulses in response to photons that are incident thereon;

light collection optics configured to form an image of the scene on the array; and processing circuitry, which is configured to count the electrical pulses output by the single-photon detectors during multiple time intervals following each of the light pulses, to detect, responsively to the counted pulses, an object located less than 10 cm away from the array that reflects at least one of the beams onto a group of the single-photon detectors, to make a comparison between respective counts of the electrical pulses output by the single-photon detectors in the group during a specified time interval immediately following each of a plurality of the light pulses, and to ascertain, responsively to the comparison, whether the object reflecting the at least one of the beams is fixed to the device or separate from the device by detecting changes in the speckle pattern between successive light pulses to distinguish between objects fixed to the device and objects separate from the device, wherein the processing circuitry is configured to compute differences between respective first and second numbers of the electrical pulses output by each of the single-photon detectors in the group that were counted in the specified time interval following first and second sequences of the light pulses, and to make the comparison by comparing the differences to a predefined threshold and to identify the object as being separate from the device when at least one of the differences is greater than the predefined threshold, and otherwise to identify the object as being fixed to the device.

2. The device according to claim 1, wherein the processing circuitry is configured to estimate, responsively to counts of the electrical pulses received from the single-photon detectors during the multiple time intervals, times of flight of the photons to and from points in the scene and to generate a three-dimensional map of the scene based on the times of flight.

3. The device according to claim 2, wherein the processing circuitry is configured to detect the object by identifying an area in the scene from which the estimated times of flight of the photons are less than a predefined minimum value.

4. The device according to claim 1, wherein the processing circuitry is configured to issue an alarm indicating a malfunction of the device upon ascertaining that the object is fixed to the device.

5. A method for optical sensing, comprising:

emitting one or more beams of light pulses from a depth-sensing device toward a scene, wherein the light pulses comprise coherent light, which forms a speckle pattern when scattered from objects;

forming an image of the scene on an array of single-photon detectors in the depth-sensing device;

counting electrical pulses output by the single-photon detectors in response to photons that are incident thereon during multiple time intervals following each of the light pulses;

detecting, responsively to the counted pulses, an object located less than 10 cm away from the array that reflects at least one of the beams onto a group of the single-photon detectors;

making a comparison between respective counts of the electrical pulses output by the single-photon detectors in the group during a specified time interval immediately following each of a plurality of the light pulses to detect changes in the speckle pattern between successive light pulses, wherein making the comparison comprises computing differences between respective first and second numbers of the electrical pulses output by each of the single-photon detectors in the group that were counted in the specified time interval following first and second sequences of the light pulses, and comparing the differences to a predefined threshold; and ascertaining, responsively to the comparison, whether the object reflecting the at least one of the beams is fixed to the device or separate from the device based on the changes in the speckle pattern, wherein ascertaining whether the object reflecting the at least one of the beams is fixed to the device or separate from the device comprises identifying the object as being separate from the device when at least one of the differences is greater than the predefined threshold, and otherwise to identify the object as being fixed to the device.

6. The method according to claim 5, and comprising, responsively to counts of the electrical pulses received from the single-photon detectors during the multiple time intervals, times of flight of the photons to and from points in the scene and generating a three-dimensional map of the scene based on the times of flight.

7. The method according to claim 6, wherein detecting the object comprises identifying an area in the scene from which the estimated times of flight of the photons are less than a predefined minimum value.

8. The method according to claim 5, and comprising issuing an alarm indicating a malfunction of the device upon ascertaining that the object is fixed to the device.

* * * * *